(12) United States Patent
Wang et al.

(10) Patent No.: US 8,249,612 B2
(45) Date of Patent: Aug. 21, 2012

(54) METHOD, SYSTEM, SERVER, AND CLIENT FOR TRANSMITTING MEDIA BURST DATA

(75) Inventors: Zheng Wang, Shenzhen (CN); Zhefeng Yan, Shenzhen (CN); Lei Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 156 days.

(21) Appl. No.: 12/795,489

(22) Filed: Jun. 7, 2010

(65) Prior Publication Data

US 2010/0240378 A1 Sep. 23, 2010

Related U.S. Application Data

(63) Continuation of application No. PCT/CN2008/072754, filed on Oct. 20, 2008.

(30) Foreign Application Priority Data

Dec. 7, 2007 (CN) .......................... 2007 1 0178965

(51) Int. Cl.
*H04Q 7/20* (2006.01)
*H04W 72/04* (2009.01)
(52) U.S. Cl. ..................... 455/452.1; 455/519; 455/509; 455/517
(58) Field of Classification Search .................. 455/518, 455/517, 519, 520, 509, 452.1, 450, 456.3, 455/41.1, 41.2, 3.01, 3.06; 370/328
See application file for complete search history.

(56) References Cited

U.S. PATENT DOCUMENTS

| | | | |
|---|---|---|---|
| 7,720,983 B2 * | 5/2010 | Klemets et al. | ............... 709/231 |
| 2006/0002328 A1 * | 1/2006 | Naghian | ....................... 370/328 |
| 2006/0116149 A1 | 6/2006 | Dunn et al. | |
| 2009/0024743 A1 | 1/2009 | Zhang et al. | |
| 2009/0325561 A1 | 12/2009 | Xu et al. | |
| 2010/0240378 A1 | 9/2010 | Wang et al. | |

FOREIGN PATENT DOCUMENTS

| | | |
|---|---|---|
| CN | 1230014 C | 11/2005 |
| CN | 101047529 A | 10/2007 |
| CN | 101079720 A | 11/2007 |
| CN | 101188815 A | 5/2008 |
| WO | WO 2009/071005 A1 | 11/2005 |
| WO | WO 2006/027006 A1 | 3/2006 |

OTHER PUBLICATIONS

Supplementary European Search Report, European Application No. 08858019.6-2412, Applicant: Huawei Device Co., Ltd., Dated: Oct. 11, 2010, 6 pages.

European Office Action, European Application No. 08 858 019.6-2412, Applicant: Huawei Device Co., Ltd., Dated: Mar. 25, 2011, 5 pages.

(Continued)

*Primary Examiner* — John J Lee
(74) *Attorney, Agent, or Firm* — Slater & Matsil, L.L.P.

(57) ABSTRACT

A method for transmitting media burst data includes grouping all clients in a session into a first session group and a second session group. The media burst data is forwarded to the clients in the first session group and sent to the clients in the second session group through the clients in the first session group.

20 Claims, 10 Drawing Sheets

OTHER PUBLICATIONS

Lei, Z., et al., "Application of P2P Technology in Streaming Meadia," China Acemdemic Journal Electronic Publishing House, Nov. 2006, 3 pages.

OMA, "PoC User Plane," Open Mobile Alliance Specification, OMA-TS-PoC_UserPlane-V1_0_2-20070905-A, Approved Version 1.0.2, Sep. 5, 2007, 177 pages, Open Mobile Alliance Ltd.

OMA, "PoC Control Plane," Open Mobile Alliance Specification, OMA-TS-PoC_ControlPlane-V1_0_2-20070905-A, Approved Version 1.0.2, Sep. 5, 2007, 274 pages, Open Mobile Alliance Ltd.

International Search Report, PCT/CN 2008/072754, Date of mailing Jan. 8, 2009, 4 pages.

First Chinese Office Action, Chinese Application No. 200710178965.X, Dated Oct. 30, 2009, 7 pages.

English Translation of the International Preliminary Report on Patentability, PCT/CN2008/072754, Date of issuance Jun. 8, 2010, 5 pages.

* cited by examiner

METHOD, SYSTEM, SERVER, AND CLIENT FOR TRANSMITTING MEDIA BURST DATA

This application is a continuation of co-pending International Application No. PCT/CN2008/072754, filed Oct. 20, 2008, which designated the United States and was not published in English, and which claims priority to Chinese Application No. 200710178965.X filed Dec. 7, 2007, both of which applications are incorporated herein by reference.

TECHNICAL FIELD

The present invention relates to a method, a system, a server, and a client for transmitting data, and in particular, to a method, a system, a server, and a client for transmitting media burst data.

BACKGROUND

PTT over Cellular (PoC) is a service defined by Open Mobile Alliance (OMA) for implementing group sessions on a packet-switched network. The PoC uses Voice over Internet Protocol (VoIP) and half duplex to implement real-time communication of the client efficiently at low costs. The PoC service is characterized as follows. Without dialing, the user can press a special key to implement voice communication; multicast is enabled, namely, one person speaks, and many persons listen; the group is defined beforehand or temporarily; a half duplex mode is applied in the conversation process, and the called party cannot speak while listening; and the client stays online, it takes a short time to set up a call, and the dialing is convenient.

The OMA gives an elementary definition of the network framework of the PoC. As shown in FIG. 1, the network framework includes a PoC client, a PoC server, a core network that supports SIP/IP (SIP/IP core), a PoC XML Document Management Server (XDMS), a presence server, a presence source, a watcher, a Document Management (DM) client, an XML Document Management Client (XDMC), a shared XDMS, an aggregation proxy, a DM server, an access network, and a remote PoC network.

The PoC function is primarily implemented by a PoC server and a PoC client. The PoC XDMS and the XDMC implement the PoC group information management operation. The PoC client implements signaling interaction with the PoC server under session control through a PoC-1 interface, a SIP/IP Core, and a PoC-2 interface, and implements media transmission through a PoC-3 interface.

Peer-to-peer communication runs when various devices on the same network communication level of a hierarchical architecture interact with each other.

In the existing PoC standard, media bursts carried over Real-time Transport Protocol (RTP) in a session, media burst control signaling, and quality feedback reports all pass through the PoC-3 interface and the PoC-4 interface. As shown in FIG. 2, in all session types, RTP media transmission is simplex. Therefore, at a specific moment, only one participant is allowed to initiate RTP media bursts. Both sent and received RTP media bursts pass through the controlling PoC server. Some PoC servers capable of forwarding (such as PoC Server A and PoC Server B in FIG. 2) are responsible for forwarding the RTP media bursts to the PoC server provided with the control function (CF), and then the CF PoC server distributes the media bursts to all PoC clients that participate in the session.

In the process of developing the present invention, the inventor detects at least these problems in the prior art. In the PoC standard and the service solution in the prior art, the media bursts generated by client talk bursts in a PoC service session are distributed by a PoC server capable of the CF to clients in a centralized way. Such a practice in the prior art brings these defects. The PoC server needs to distribute the media bursts received and generated by client talk bursts to other session participants, without allowing for impact on traffic transmission caused by the geographic area of the PoC client or for sufficient use of the terminal capabilities, whereas the PoC server bears a heavy load, and the network traffic near the PoC server is high, especially when the PoC 2.0 supports multimedia bursts and discrete media bursts (such as files).

SUMMARY OF THE INVENTION

The embodiments of the present invention provide a method, a system, a server, and a client for transmitting media burst data to relieve the load of the PoC server and implement distributed sharing of network resources.

A method for transmitting media burst data in an embodiment of the present invention includes grouping all clients in a session into a first session group and a second session group. Media burst data sent by a client that holds the floor is forwarded to clients in the first session group. The media burst data is sent to clients in the second session group through the clients in the first session group.

A system for transmitting media burst data is provided in an embodiment of the present invention. The system includes a PoC server and the PoC server includes a grouping module that is adapted to group all clients in a session into a first session group and a second session group. A media burst data forwarding module is adapted to forward media burst data sent by a client that holds the floor to clients in the first session group.

The clients in the first session group are adapted to receive the media burst data sent by the PoC server, and forward the media burst data to the clients in the second session group.

A PoC server provided in an embodiment of the present invention includes a grouping module that is adapted to group all clients in a session into a first session group and a second session group. A media burst data forwarding module is adapted to forward media burst data sent by a client that holds the floor to clients in the first session group according to a grouping result of the grouping module.

A client provided in an embodiment of the present invention includes a mapping relationship storing module that is adapted to receive and store relationships of forwarding media burst data between this client and other clients. A media burst data forwarding module is adapted to forward media burst data, which is directed to other clients, to other clients according to the media burst data forwarding relationships stored in the mapping relationship storing module.

In the technical solution under the present invention, the client forwards the media burst data. Therefore, the number of times of forwarding the media burst data by the PoC server is reduced, the load of the PoC server is relieved, and distributed sharing of network resources is implemented.

BRIEF DESCRIPTION OF THE DRAWINGS

The technical solution under the present invention is elaborated below with reference to the accompanying drawings and preferred embodiments.

DETAILED DESCRIPTION OF ILLUSTRATIVE EMBODIMENTS

In an embodiment of the present invention, a client that participates in a session in a PoC service forwards media bursts/talk bursts, and controls the transmission process. The detailed solution is as follows. The PoC server groups the clients involved the PoC session into two groups (group A and group B) according to a policy, and sends the media bursts/talk bursts sent by the client that holds the floor to the clients in group A. The PoC clients in group A forward the media bursts/talk bursts received from the PoC server to the corresponding clients in group B.

First Embodiment

Figure 1:
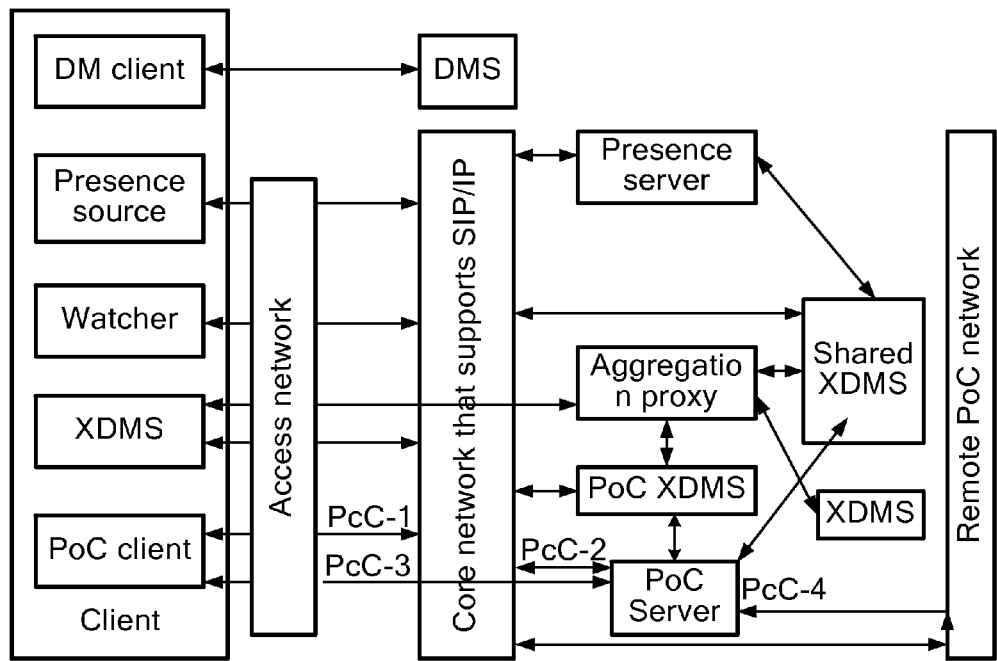
FIG. 1 shows a structure of a PoC service system in the prior art.
Figure 2:
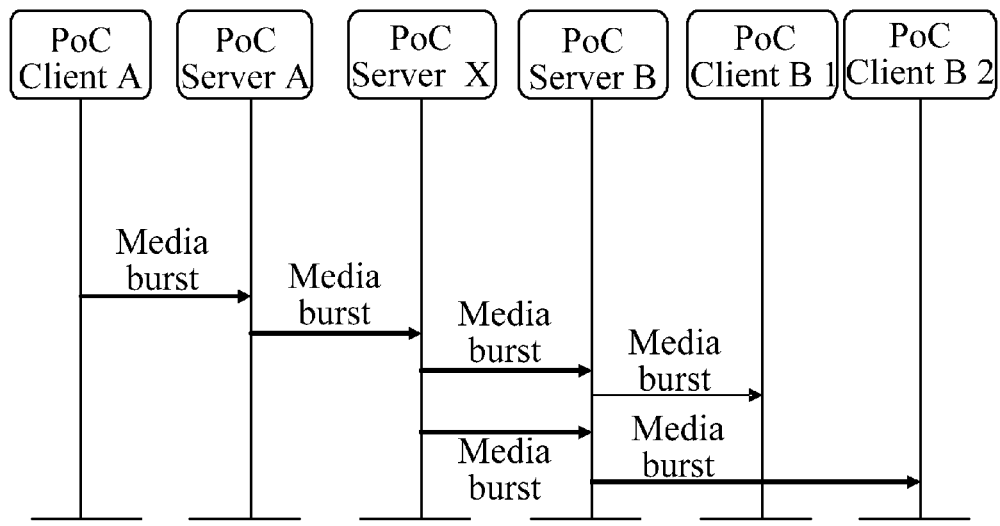
FIG. 2 is a signaling chart of media burst transmission in a PoC session in the prior art.
Figure 3:
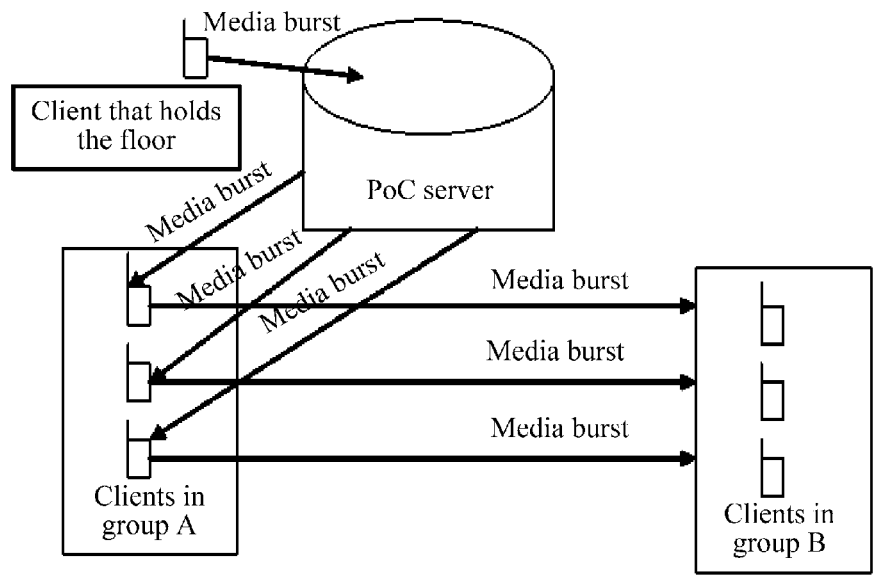
FIG. 3 shows burst transmission in a method for transmitting media burst data in the first embodiment of the present invention.
Figure 4:
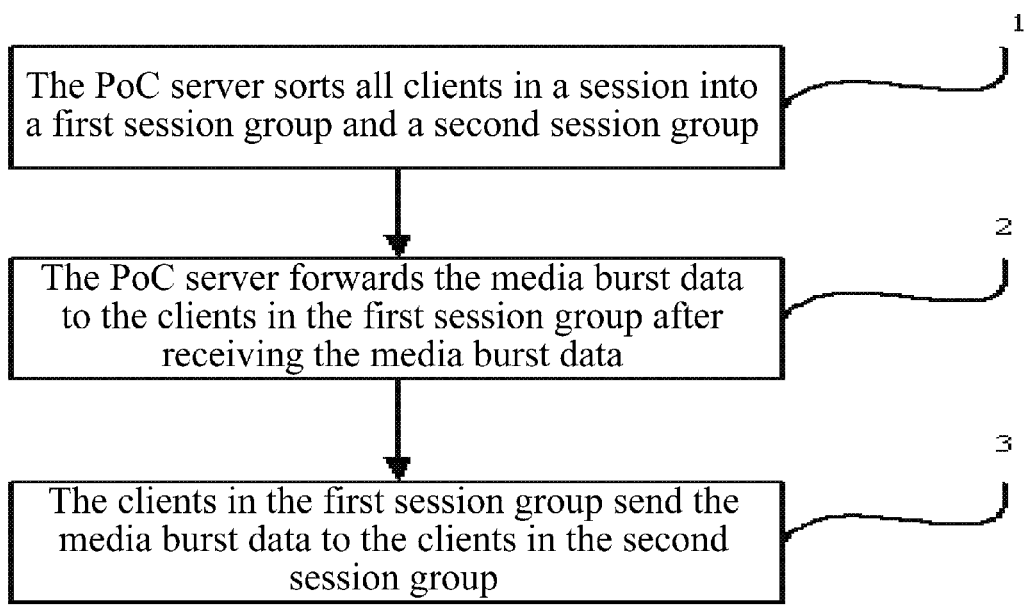
FIG. 4 is a flowchart of a method for transmitting media bursts in the first embodiment of the present invention.

FIG. 3 shows data burst transmission in a method for transmitting media burst data, and FIG. 4 is flowchart of a method for transmitting media bursts in an embodiment of the present invention, where PoC client A is a client in group A; PoC client B1 and PoC client B2 are clients in group B; PoC server A and PoC server B are participating servers; and PoC server X is a controlling server. The method includes the following steps.

Step 1: The PoC server groups all clients in a session into a first session group (group A) and a second session group (group B).

Step 2: The PoC server forwards media burst data sent by a client that holds the floor to clients in the first session group.

PoC client X (which may be in group A or group B) obtains the floor, and its media bursts/talk bursts are split into several RTP packets for transmitting. It is assumed that the RTP packets are RTP1, RTP2, RTP3, and so on. Client X sends the RTP packets to the PoC server sequentially.

Step 3: The clients in the first session group send the media burst data to the clients in the second session group.

After RTP1 arrives at the PoC server, the PoC server distributes RTP1 to only the clients in group A, and then the clients in group A distributes them to the clients in group B (in a one-to-one relationship, or the mapping relationship is set flexibly as required). It is the same with RTP2, RTP3, and so on, until all RTPs of the media bursts/talk bursts are sent.

With respect to the media burst transmission method in this embodiment, supplementary description is provided below.

(1) In the clients involved in the session, seed clients for forwarding packets (namely, a client in group A) may be selected according to one of the following policies.

Mode 1: Seed clients are selected among the local clients involved in the session (when the session is distributed in multiple cities).

Mode 2: Seed clients are selected according to capabilities (capability of sending information, supported media, and bandwidth) of a mobile terminal. The capabilities of the terminal may be detected through media negotiation. After clients in group A are determined, the configuration data and the media negotiation result are sent to the clients in group A.

The clients in group A may also be selected according to both mode 1 and mode 2. That is, media negotiation is performed among the local clients involved in the session to detect the capabilities of the clients, and then a seed client is selected according to the capabilities of the mobile terminal.

The PoC server needs to be capable of selecting seed clients according to a policy, including obtaining the number of clients involved in the session, and judging whether to continue allocating seed clients; and obtaining the location information and capability information of the clients, determining and selecting the seed client, and distributing the selection result to the clients.

(2) The clients in group A may match the clients in group B in the following way.

At the time of setting up a session, after each client joins the session, the PoC server knows the PoC address (SIP address), the IP address, and the port number of each session participant. According to the policy of selecting seed clients, the PoC server determines which are seed clients (clients in group A), which are non-seed clients (clients in group B), and the corresponding download relationship between the seed clients and non-seed clients (namely, a seed client from which a non-seed client downloads packets), and the precedence order of the seed clients. Such information is sent to each client through a Notify message, and the PoC server is temporarily responsible for transmitting the media bursts of the non-seed clients. After a User Datagram Protocol (UDP) connection is established between a non-seed client and the corresponding seed client, the seed client sends the RTP packets of the media bursts to the non-seed clients, and the PoC server does not transmit the media bursts any longer.

(3) In the process of a session, the seed clients may be adjusted dynamically according to events that occur in the session. For example, a client exits the site or is expelled from the site in an Adhoc session or a chat, and a new client joins the site. When the status of a client involved in the session changes (for example, the client joins or exits the session), the processing method is as follows.

After the PoC client joins the session, the PoC server knows the PoC address (SIP address), IP address, and port number of each session participant, and determines whether the client is a seed client according to the policy of selecting seed clients. According to the OMA PoC standard, the PoC server capable of the CF notifies other clients that a new member joins the session. Through this Notify message, the PoC server can modify the mapping relationship table, and send the latest mapping relationship table and the media negotiation result to the seed clients whose mapping relationship has changed in group A, without increasing any message traffic.

According to the OMA PoC standard, when the client exits the session, the PoC server capable of the CF notifies other clients that a PoC client exits the session. Through this Notify message, the PoC server can modify the mapping relationship, and send the latest mapping relationship and the media negotiation result to the seed clients whose mapping relationship has changed in group A, without increasing any new message traffic.

Before the new seed client in place of the exiting seed client establishes a UDP connection with the residual non-seed clients, the PoC server capable of the CF is temporarily responsible for transmitting media bursts. Once a UDP connection is established between them, the new seed client is responsible for forwarding the media bursts.

(4) After receiving the RTP packets of media bursts from the PoC server, the seed client forwards the RTP packets to the corresponding non-seed client immediately. If the first seed client waits for the RTP packet at certain time but fails to receive the RTP packet, the first seed client reports the failure to the PoC server, and the PoC server is temporarily responsible for transmitting the RTP packet.

(5) The seed client needs to enhance functions as follows.

The seed client needs to be capable of receiving the configuration data and media negotiation results from the server, and configuring the client according to the configuration data. The seed client needs to be capable of forwarding media bursts between the non-seed PoC client and the PoC server capable of the CF, and establishing a UDP connection with the new non-seed PoC client.

Second Embodiment

Figure 5:
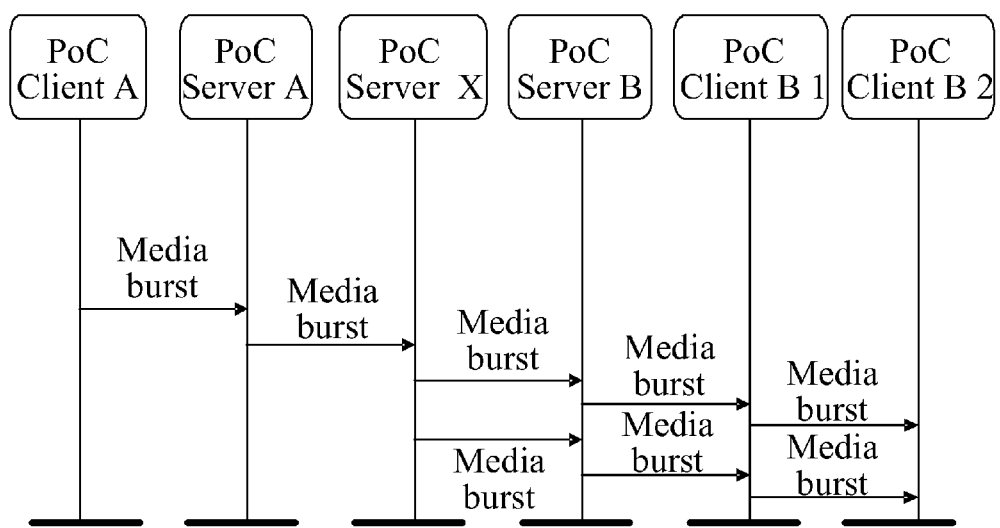
FIG. 5 is a signaling chart of a method for transmitting media bursts in the second embodiment of the present invention.
Figure 6:
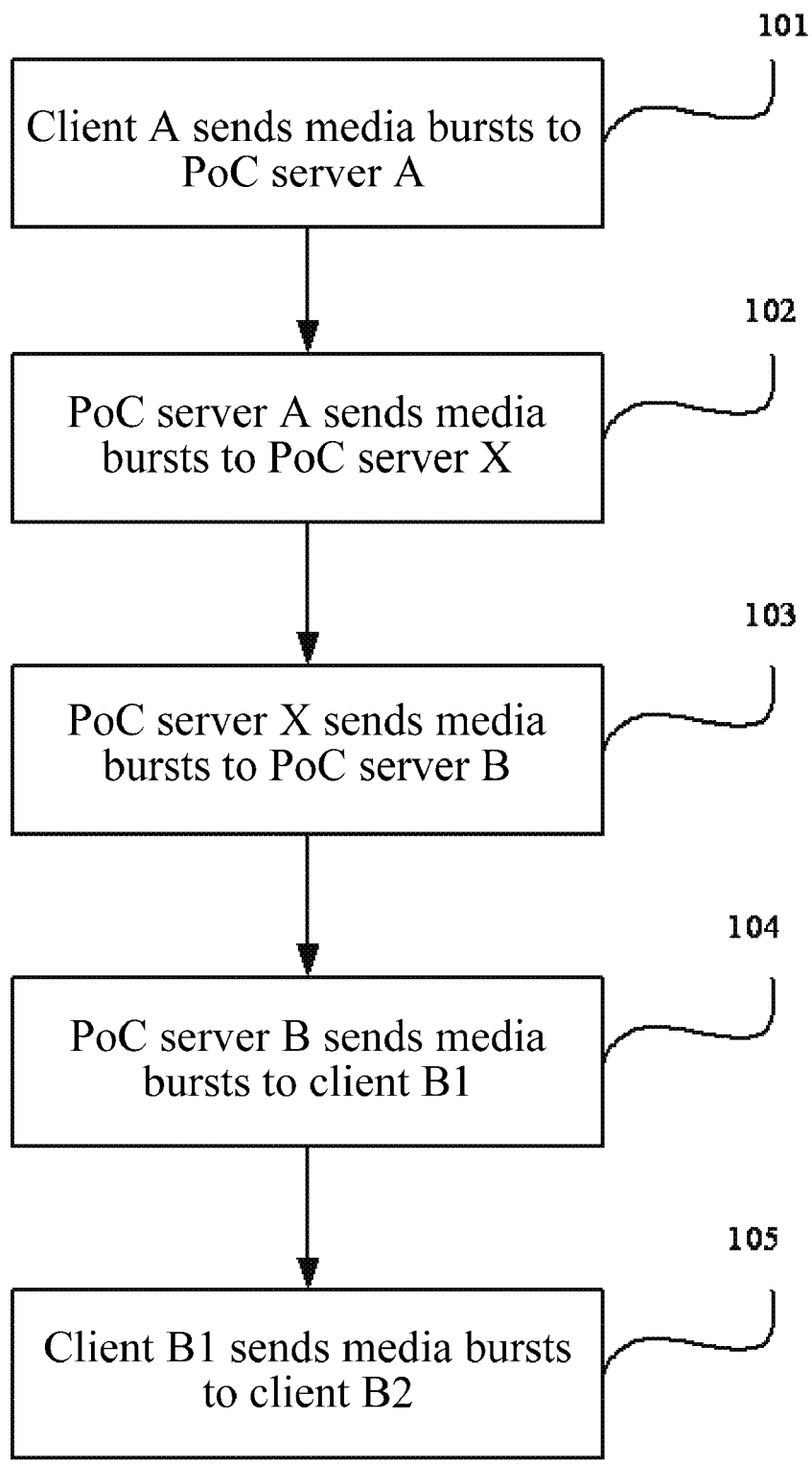
FIG. 6 is a flowchart of a method for transmitting media bursts in the second embodiment of the present invention.

This embodiment gives details of a procedure in which a client forwards media bursts/talk bursts. As shown in FIG. 5 and FIG. 6, PoC client A is a client in group A, PoC client B1 and PoC client B2 are clients in group B, PoC server A and PoC server B are participating servers, and PoC server X is a controlling server. The procedure includes the following steps.

Step 101: Client A1 authorized to send media bursts sends the media bursts to PoC server A which is responsible for forwarding the media bursts sent by client A1.

Step 102: PoC server A sends the media bursts to PoC server X which is responsible for the control function in this session.

Step 103: PoC server X sends the media bursts to PoC server B which is responsible for forwarding the media bursts to PoC client B1.

Step 104: PoC server B sends the media bursts to client B1.

Step 105: PoC client B1 sends the media bursts to client B2.

According to the current standard, at the same time of performing step 103, PoC server X sends the media bursts to PoC server B, and PoC server B sends the media bursts to client B2. This embodiment saves one attempt to transmit the same media bursts from PoC server X.

Third Embodiment

Figure 7:
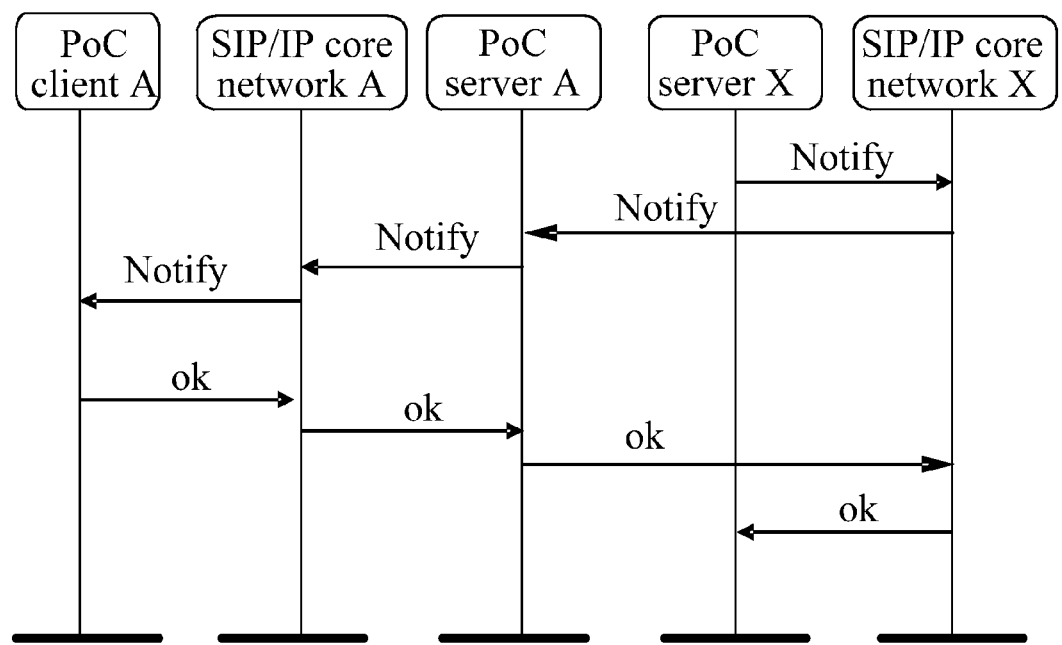
FIG. 7 is a signaling chart of processing a reservation event in a PoC session in the third embodiment of the present invention.
Figure 8:
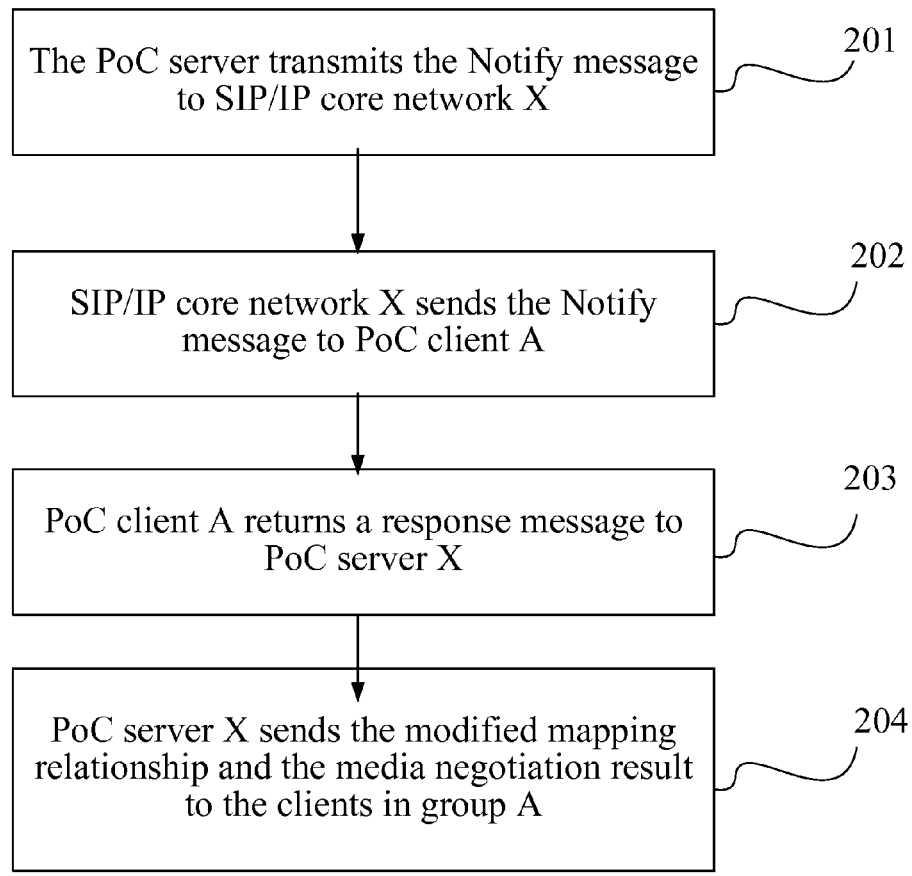
FIG. 8 is a flowchart of processing a reservation event in a PoC session in the third embodiment of the present invention.

When a reservation event occurs on the PoC site, CF PoC server X modifies the media burst forwarding relationship between a client in group A and a client in group B according to the policy of selecting the clients involved the reservation event, and sends the modified relationship and the media negotiation result to the clients in group A. As shown in FIG. 7 and FIG. 8, the procedure includes the following steps.

Step 201: When a reservation event occurs on the PoC site, CF PoC server X determines new mapping relationships according to a policy of selecting the seed clients. The CF PoC server X creates a Notify message and sends it to SIP/IP core X. The Notify message carries the message reserved by the client, new mapping relationships, and the media negotiation result.

Step 202: Through PoC server A and SIP/IP core A, SIP/IP core X transmits the Notify message to PoC client A.

Step 203: PoC client A returns an OK message to PoC server X in response to the Notify message.

Step 204: PoC server X sends the modified mapping relationship and the media negotiation result to the clients in group A.

Fourth Embodiment

Figure 9:
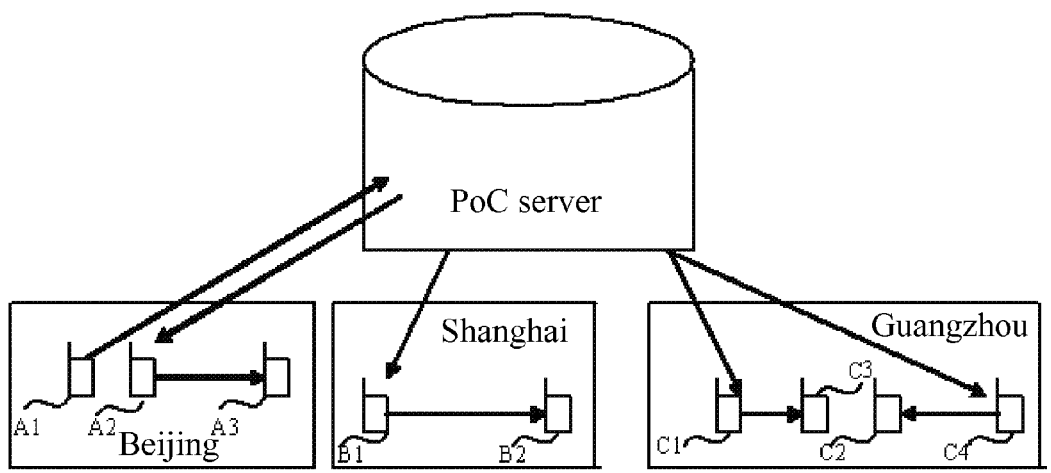
FIG. 9 shows burst transmission in a method for transmitting media burst data in the fourth embodiment of the present invention.

In this embodiment, it is assumed that six clients participate in a PoC session. As shown in FIG. 9, clients A1, A2, and A3 are located in Beijing, clients B1 and B2 are located in Shanghai, clients C1, C2, C3, and C4 are located in Guangzhou, and the CF PoC server is located in Guangzhou.

1: After the session is set up, the PoC server selects A1, A2, B1, C1, and C2 as seed clients. The mapping relationships of media burst transmission from a seed client to a non-seed client are A2->A3, B1->B2, C1->C3, and C2->C4. The PoC server transmits the mapping relationships to each PoC session participant.

2: After the session begins, client A1 obtains the floor, and its media bursts are transmitted to the PoC server first, and are then forwarded by the PoC server to A2, B1, C1, and C2.

3: After A2, B1, C1, and C2 obtain the RTP of the media bursts, A2 transmits them to A3 immediately, B1 transmits them to B2 immediately, C1 transmits them to C3 immediately, and C2 transmits them to C4 immediately.

In the session, if a seed client exits the site, another preconfigured seed client takes the place of it. For example, if C2 exits the session, the PoC server notifies another client C2 in the session to exit by sending a Notify message. The Notify message sent to C1 and C4 carries the configuration content to be modified (the message is transmitted by client C1 to client C4), and the configuration is modified. A UDP connection is established between C1 and C4. The CF PoC server is responsible for transmitting subsequent media bursts. After the UDP connection is established successfully, C1 is responsible for transmitting subsequent media bursts.

In the session, if a client joins the site, for example, client C2 joins the site again, PoC server selects C1 for transmitting the media bursts of C2, and notifies client C2 to join by sending a Notify message. This Notify message carries the modified configuration to C1 and C2 so that a UDP connection is established between C1 and C2.

In the standard mode of transmitting media bursts in the prior art, the PoC server transmits the media bursts to A1, A2, A3, B1, B2, C1, C2, and C3. By contrast, in this embodiment, the number of times of transmitting the media bursts from the PoC server in Guangzhou decreases from 8 to 4. The path for transmitting the media bursts from Guangzhou to A3 in Beijing is much longer than the path for transmitting the media bursts from A2 in Beijing to the local A3.

Figure 10:
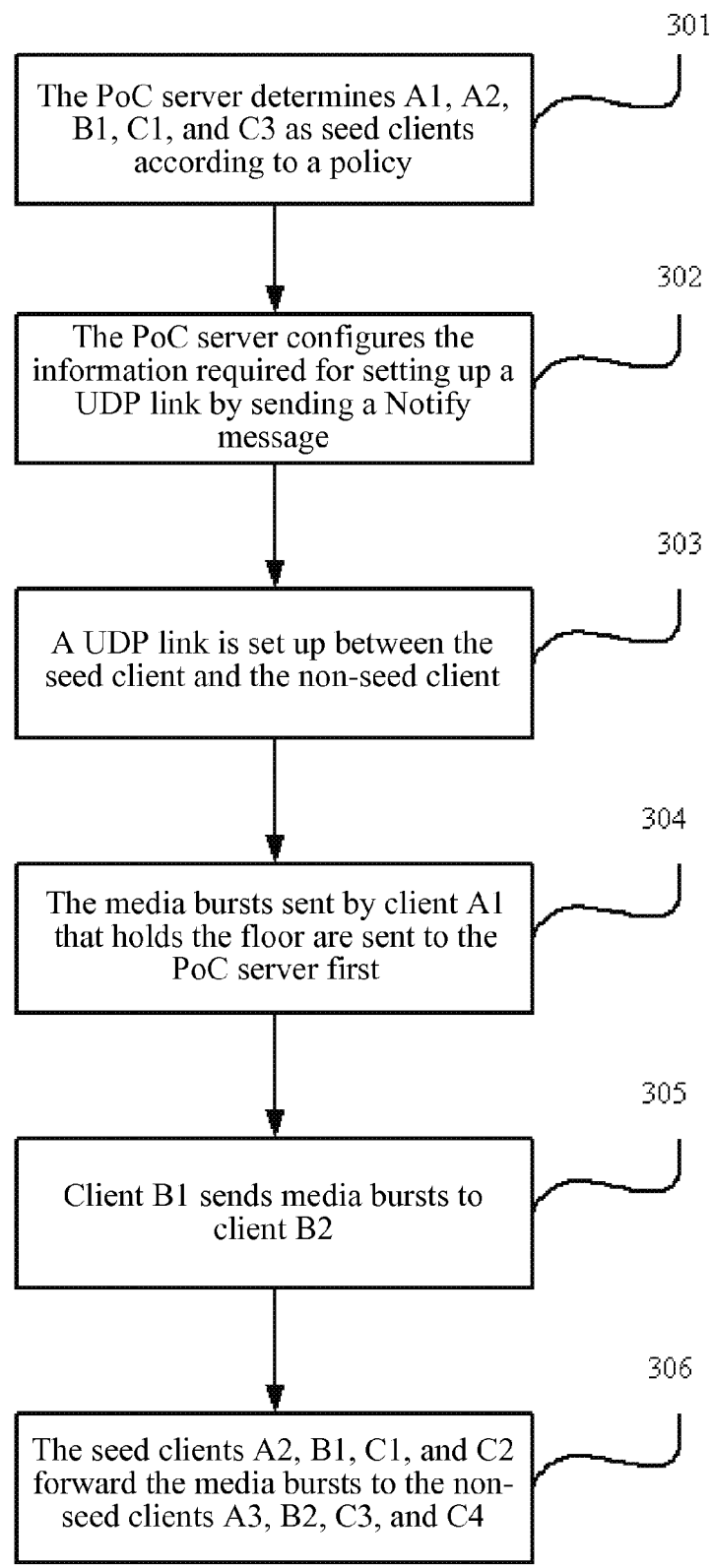
FIG. 10 is a flowchart of a method for transmitting media burst data in the fourth embodiment of the present invention.

As shown in FIG. 10, the media burst transmission procedure includes the following steps.

Step 301: PoC client A1 invites A2, A3, B1, B2, C1, C2, and C3 to the PoC session successfully, and the PoC server determines A1, A2, B1, C1, and C3 as seed clients and determines others as non-seed PoC clients according to a policy.

Step 302: By sending a Notify message, the PoC server configures information (IP address of the peer, source port, destination port number) required for establishing a UDP connection between a seed PoC client and a non-seed PoC client.

Step 303: A UDP connection is established between the seed PoC client and the non-seed client.

Step 304: In the session, the media bursts sent by client A1 that obtains the floor are sent to the PoC server first.

Step 305: The PoC server sends the received media bursts only to the seed clients A2, B1, C1, and C2.

Step 306: The seed clients A2, B1, C1, and C2 forward the media bursts to the non-seed clients A3, B2, C3, and C4.

Figure 11:
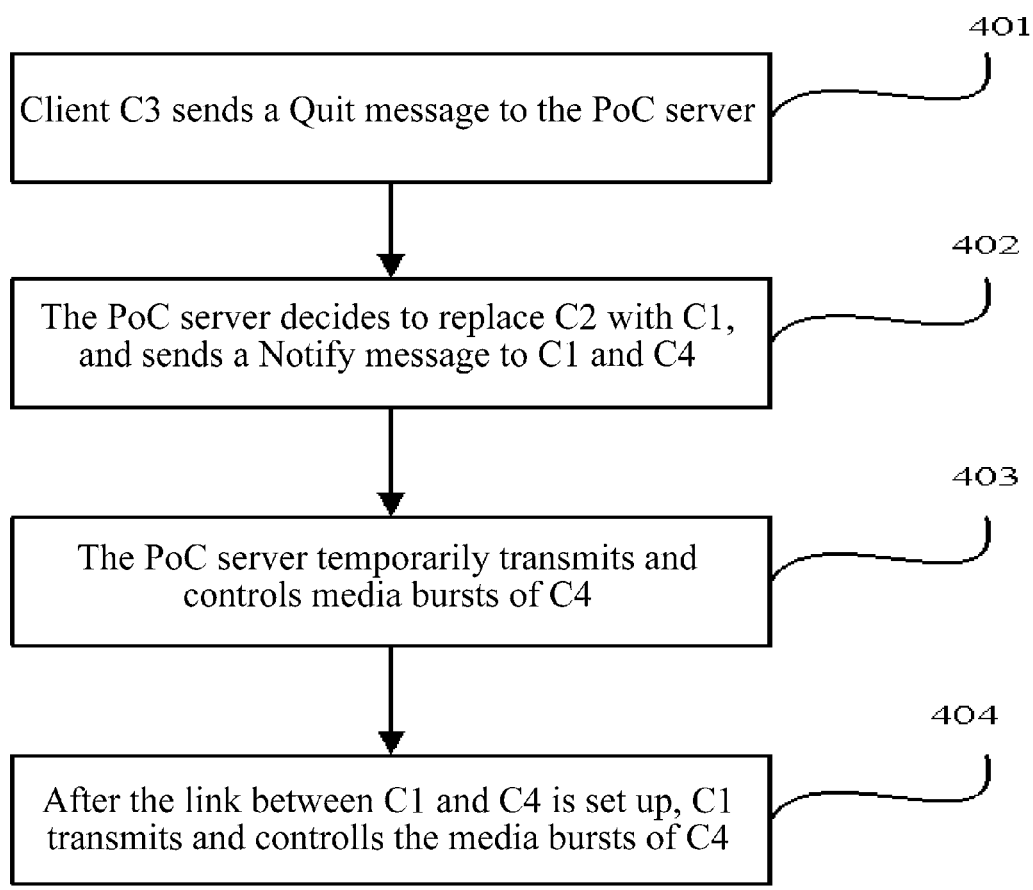
FIG. 11 is a flowchart of processing when a seed client exits a session in the fourth embodiment of the present invention.

When a seed client exits the session, as shown in FIG. 11, the following procedure is performed.

Step 401: The seed PoC client C2 sends a BY message to the PoC server, requesting to exit the PoC session.

Step 402: According to the policy, the PoC server decides that the seed PoC client C1 takes the place of C2 to transmit media bursts to C4, and sends a Notify message to C1 and C4. The Notify message carries the information (IP address and port number) required for establishing the UDP connection.

Step 403: The PoC server temporarily transmits and controls media bursts of C4.

Step 404: After the connection between C1 and C4 is established, C1 transmits and controls the media bursts of C4 in place of the CF PoC server.

Fifth Embodiment

Figure 12:
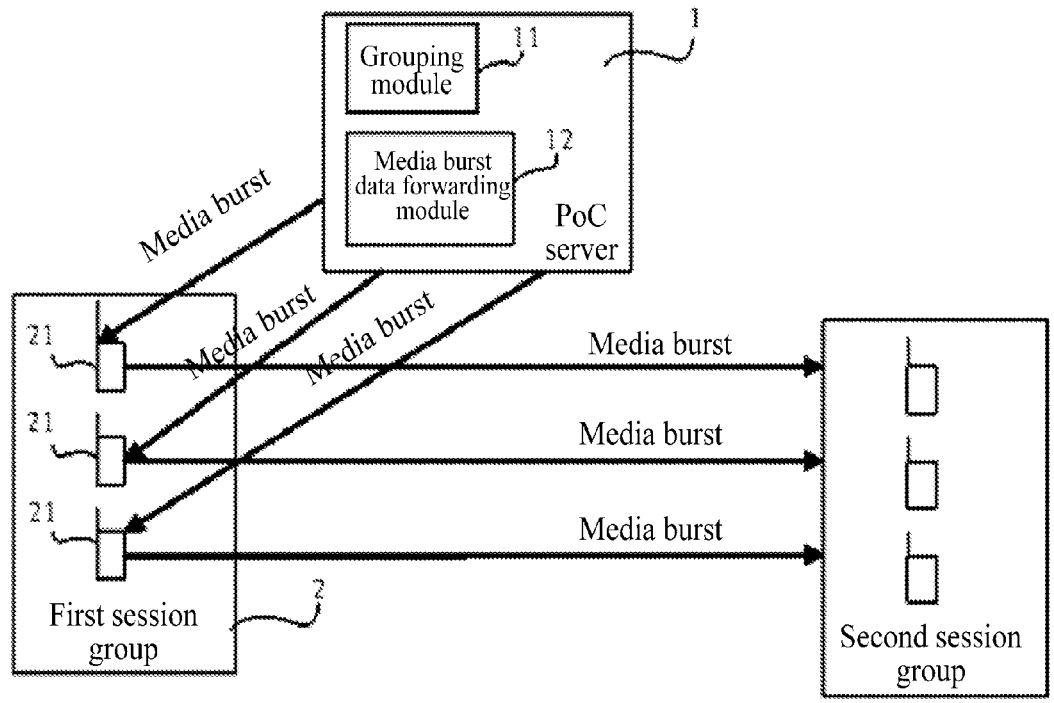
FIG. 12 shows a structure of a system for transmitting media burst data in the fifth embodiment of the present invention.

As shown in FIG. 12, a system for transmitting media burst data in this embodiment includes a PoC server 1. The PoC server 1 includes a grouping module 11 that is adapted to group all clients in a session into a first session group and a second session group. A media burst data forwarding module 12 is adapted to forward media burst data sent by a calling client to clients in the first session group 2. Clients 21 in the first session group 2 are adapted to receive the media burst data sent by the PoC server and forward the media burst data to the clients in the second session group.

The PoC server further includes a mapping relationship generating module, which is adapted to set mapping relationships of forwarding media burst data between a client in the first session group and a client in the second session group, generate mapping relationship information, and send the mapping relationship information to the clients in the first session group.

The client 21 may further include a mapping relationship recording module, adapted to receive the mapping relationship information sent by the mapping relationship generating module of the PoC server, and establish a UDP connection to the clients in the second session group according to the mapping relationship information.

The PoC server may further include a media negotiating module, adapted to perform media negotiation with all clients in the session, select the clients of the first session group, and send the information about the selected clients of the first session group to the mapping relationship generating module.

Sixth Embodiment

Figure 13:
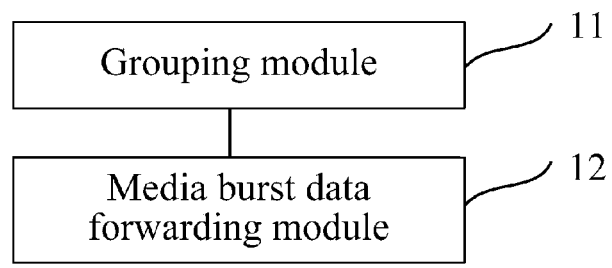
FIG. 13 shows a structure of a PoC server in the sixth embodiment of the present invention.

As shown in FIG. 13, a PoC server provided in this embodiment includes a grouping module 11 that is adapted to group all clients in a session into a first session group and a second session group. A media burst data forwarding module 12 is adapted to forward media burst data sent by a client that holds the floor to clients in the first session group according to a grouping result of the grouping module.

The server further includes a mapping relationship generating module, which is adapted to set the mapping relationships of forwarding media burst data between a client in the first session group and a client in the second session group.

Seventh Embodiment

Figure 14:
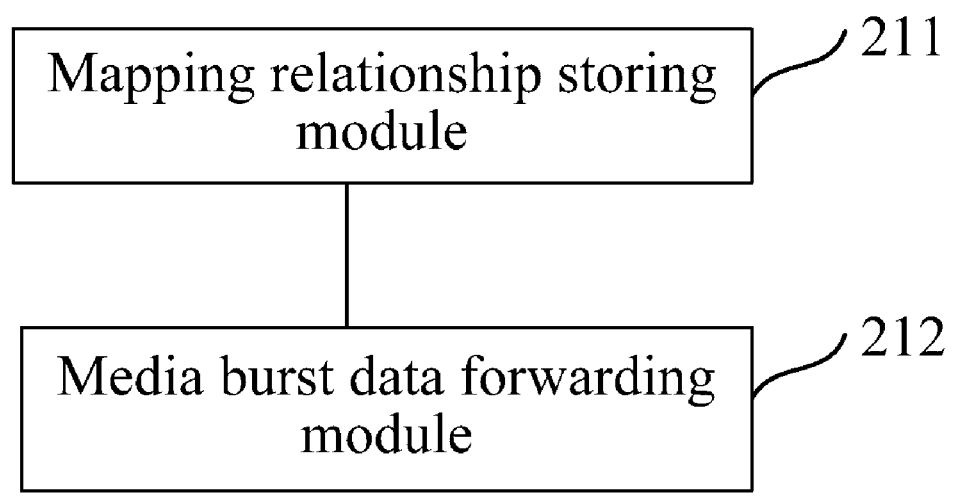
FIG. 14 shows a structure of a client in the seventh embodiment of the present invention.

As shown in FIG. 14, a client is provided in this embodiment. This client is the client in the first session group in the foregoing embodiment. The client includes a mapping relationship storing module 211 that is adapted to receive and store relationships of forwarding media burst data between this client and other clients. A media burst data forwarding module 212 is adapted to forward media burst data, which is directed to other clients, to other clients according to the media burst data forwarding relationships stored in the mapping relationship storing module.

Through the method and the system for transmitting media burst data in the embodiments of the present invention, the number of times of sending media bursts from the CF PoC server is reduced, the load of the PoC server and the nearby LAN is relieved, the capabilities of the PoC client are made full use of, and the traffic is equalized and edged.

It should be noted that the above embodiments are merely provided for describing the technical solutions of the present invention, but not intended to limit the present invention. It is apparent that persons skilled in the art can make various modifications and variations to the invention without departing from the scope of the invention. The present invention is intended to cover the modifications and variations provided that they fall in the scope of protection defined by the following claims or their equivalents.

What is claimed is:

1. A method for transmitting media burst data, the method comprising:
    grouping all clients in a session into a first session group and a second session group;
    setting mapping relationships of forwarding the media burst data between clients in the first session group and clients in the second session group;
    generating mapping relationship information;
    sending the mapping relationship information to the clients in the first session group;
    forwarding media burst data sent by a client that holds the floor to the clients in the first session group; and
    sending the media burst data to the clients in the second session group through the clients in the first session group.

2. The method of claim 1, further comprising, by the clients in the first session group, establishing a User Datagram Protocol (UDP) connection with the clients in the second session group according to the mapping relationship information after receiving the mapping relationship information.

3. The method of claim 2, wherein:
    if the second session group comprises any client that has no UDP connection with the client in the first session group, a PTT over Cellular (PoC) server sends the media burst data directly to the client that has no UDP connection with the client in the first session group.

4. The method of claim 1, wherein:
    if the clients in the first session group fail to receive the media burst data or forward the media burst data, the clients report the failure to a PTT over Cellular (PoC) server, and the PoC server forwards the media burst data to the clients in the second session group.

5. The method of claim 1, wherein the mapping relationships are one-to-one mapping relationships between the clients in the first session group and the clients in the second session group.

6. The method of claim 1, wherein all the clients in the session are grouped into the first session group and the second session group in the following way:
the PTT over Cellular (PoC) server performs media negotiation with all the clients in the session, selects the clients of the first session group according to capabilities of the clients;
and/or the PoC server selects the clients of the first session group among local clients of the session, and selects other clients in the session as the clients of the second session group.

7. The method of claim 1, further comprising modifying the mapping relationships of forwarding the media burst data between the clients in the first session group and the clients in the second session group according to a policy of selecting clients involved in a reservation event if the reservation event occurs in the session, generating information related to the modified mapping relationships, and sending the generated information to the clients in the first session group.

8. The method of claim 7, wherein the modifying the mapping relationships, generating information and sending the generated information are performed by a PTT over Cellular (PoC) server.

9. The method of claim 1, wherein:
when a new client joins the session, a PTT over Cellular (PoC) server negotiates with this client, and assigns this client to the first session group or the second session group according to a result of the negotiation, modifies the mapping relationships of forwarding the media burst data between the clients in the first session group and the clients in the second session group, generates information about the modified mapping relationships, and sends the generated information to the clients whose mapping relationship has changed in the first session group.

10. The method of claim 9, wherein:
when a new client joins the session, the PoC server sends a Notify message to all the clients in the session, and the Notify message sent by the PoC server to the clients whose mapping relationship has changed in the first session group carries the information about the modified mapping relationships.

11. The method of claim 1, wherein:
when any client exits the session, a PTT over Cellular (PoC) server modifies the mapping relationships of forwarding the media burst data between the clients in the first session group and the clients in the second session group, generates information about the modified mapping relationships, and sends the generated information to the clients whose mapping relationship has changed in the first session group.

12. The method of claim 11, wherein:
when any client exits the session, the PoC server sends a Notify message to all the clients in the session, and the Notify message sent by the PoC server to the clients whose mapping relationship has changed in the first session group carries the information about the modified mapping relationships.

13. A PTT over Cellular (PoC) server, comprising:
a grouping module, adapted to group all clients in a session into a first session group and a second session group;
a mapping relationship generating module, adapted to set mapping relationships of forwarding the media burst data between the clients in the first session group and the clients in the second session group; and
a media burst data forwarding module, adapted to forward media burst data sent by a client that holds the floor to the clients in the first session group according to a grouping result of the grouping module.

14. A method for transmitting media burst data, the method comprising:
grouping all clients in a session into a first session group and a second session group;
forwarding media burst data sent by a client that holds the floor to the clients in the first session group; and
sending the media burst data to the clients in the second session group through the clients in the first session group;
wherein, if the clients in the first session group fail to receive the media burst data or forward the media burst data, the clients report the failure to a PTT over Cellular (PoC) server, and the PoC server forwards the media burst data to the clients in the second session group.

15. The method of claim 14, further comprising:
setting mapping relationships of forwarding the media burst data between clients in the first session group and clients in the second session group;
generating mapping relationship information;
sending the mapping relationship information to the clients in the first session group; and
establishing, by the clients in the first session group, a User Datagram Protocol (UDP) connection with the clients in the second session group according to the mapping relationship information after receiving the mapping relationship information.

16. The method of claim 15, wherein:
if the second session group comprises any client that has no UDP connection with the client in the first session group, a PTT over Cellular (PoC) server sends the media burst data directly to the client that has no UDP connection with the client in the first session group.

17. The method of claim 14, further comprising:
setting mapping relationships of forwarding the media burst data between clients in the first session group and clients in the second session group;
generating mapping relationship information; and
sending the mapping relationship information to the clients in the first session group, wherein the mapping relationships are one-to-one mapping relationships between the clients in the first session group and the clients in the second session group.

18. The method of claim 14, wherein all the clients in the session are grouped into the first session group and the second session group in the following way:
the PTT over Cellular (PoC) server performs media negotiation with all the clients in the session, selects the clients of the first session group according to capabilities of the clients;
and/or the PoC server selects the clients of the first session group among local clients of the session, and selects other clients in the session as the clients of the second session group.

19. The method of claim 14, further comprising:

setting mapping relationships of forwarding the media burst data between clients in the first session group and clients in the second session group;

generating mapping relationship information; and sending the mapping relationship information to the clients in the first session group;

wherein, when a new client joins the session, a PTT over Cellular (PoC) server negotiates with this client, and assigns this client to the first session group or the second session group according to a result of the negotiation, modifies the mapping relationships of forwarding the media burst data between the clients in the first session group and the clients in the second session group, generates information about the modified mapping relationships, and sends the generated information to the clients whose mapping relationship has changed in the first session group.

20. The method of claim 14, further comprising:

setting mapping relationships of forwarding the media burst data between clients in the first session group and clients in the second session group;

generating mapping relationship information; and sending the mapping relationship information to the clients in the first session group;

wherein, when any client exits the session, a PTT over Cellular (PoC) server modifies the mapping relationships of forwarding the media burst data between the clients in the first session group and the clients in the second session group, generates information about the modified mapping relationships, and sends the generated information to the clients whose mapping relationship has changed in the first session group.

* * * * *